United States Patent [19]

Junkermann

[11] Patent Number: 4,814,605

[45] Date of Patent: Mar. 21, 1989

[54] ENTRANCE SYSTEM FOR A PHOTODETECTOR HAVING A 180 DEGREE IMAGE ANGLE AND DETECTOR PROVIDED THEREWITH

[75] Inventor: Wolfgang Junkermann, Garmisch-Partenkirchen, Fed. Rep. of Germany

[73] Assignee: Kernforschungsanlage Juelich Gesellschaft mit beschraenkter Haftung, Juelich, Fed. Rep. of Germany

[21] Appl. No.: 130,204

[22] Filed: Dec. 8, 1987

[30] Foreign Application Priority Data

Dec. 11, 1986 [DE] Fed. Rep. of Germany ....... 3642275

[51] Int. Cl.$^4$ .............................................. G01J 1/42
[52] U.S. Cl. ..................................... 250/227; 356/225
[58] Field of Search ................ 250/227, 228; 356/218, 356/221, 225, 226, 236

[56] References Cited

U.S. PATENT DOCUMENTS 4,253,764 3/1981 Morrill ................................ 356/225
4,609,288 9/1986 Dodge ................................ 356/218
4,703,173 10/1987 Wood et al. ........................ 250/227

FOREIGN PATENT DOCUMENTS 2440168 3/1975 Fed. Rep. of Germany ...... 356/225
2749232 2/1979 Fed. Rep. of Germany .
2461246 3/1981 France ................................ 356/218

Primary Examiner—F. L. Evans
Attorney, Agent, or Firm—Foley & Lardner, Schwartz, Jeffery, Schwaab, Mack, Blumenthal & Evans

[57] ABSTRACT

Disclosed is an entrance system having an image angle of 180° suitable for a radiation detector for detecting differing wavelengths of sunlight, comprising a hemispherical shell of light transmitting material; a tube of light transmitting material extending coaxially from the hemispherical shell; a granulated light scattering medium containing inside the hemispherical shell; and a stepped body of light transmitting material inserted into the tube, the stepped body having an end which terminates in at least three steps and which abuts against the granulated medium and seals the medium in the hemispherical shell.

16 Claims, 2 Drawing Sheets

ENTRANCE SYSTEM FOR A PHOTODETECTOR HAVING A 180 DEGREE IMAGE ANGLE AND DETECTOR PROVIDED THEREWITH

BACKGROUND OF THE INVENTION

The present invention relates to an entrance system having a 180° image angle which is made of light-transmitting material and intended for use in radiation detectors for differing wavelength ranges of sunlight. The invention also relates to a radiation detector provided with such a system.

Radiation detectors for differing wavelength ranges of sunlight are commercially available, such as, for example, a device supplied by Eppley Laboratories. In this device an arrangement of photodiode, interference filter and diaphragm is closed off by a planar diffusing screen. Such a device can be used for investigations of the chemistry of the air only to a limited extent, on account of its directionality.

Arrangements having a "fisheye objective" are accordingly already known, which arrangements have an image angle of 160°. These devices do indeed receive light from all sides up to an image angle of 160°, but their sensitivity is not uniform. Furthermore, such objectives are available only to a limited extent, and there are, in particular, problems concerning the range of ultraviolet light, for which quartz glass objectives are required.

SUMMARY OF THE INVENTION

It is therefore an object of the present invention to provide an improved radiation detector for sunlight of any selectable wavelength.

A further object of the invention resides in the provision of an improved entrance system for a radiation detector.

A particular object of the invention is to provide an entrance system which permits the detection of light from an image angle of 180° with virtually uniform sensitivity.

Another object of the invention is to provide such an entrance system which is of simple construction and is suitable to solve problems of availability.

In accomplishing the foregoing objects, there has been provided in accordance with one aspect of the present invention an entrance system having an image angle of 180° suitable for a radiation detector for detecting differing wavelengths of sunlight, comprising a hemispherical shell of light transmitting material; a tube of light transmitting material extending coaxially from the hemispherical shell; a granulated light scattering medium containing inside the hemispherical shell; and a stepped body of light transmitting material inserted into the tube, the stepped body having an end which terminates in at least three steps and which abuts against the granulated medium and seals the medium in the hemispherical shell.

In accordance with another aspect of the invention, there has been provided a radiation detector for sunlight, comprising a detector member having a light-sensitive element; and optically connected to the light-sensitive element an entrance system having an image angle of 180° and comprising an entrance system as defined above.

Further objects, features and advantages of the present invention will become apparent from the detailed description of preferred embodiments that follows, when considered together with the attached figures of drawings

DETAILED DESCRIPTION OF PREFERRED EMBODIMENTS

Figure 1:
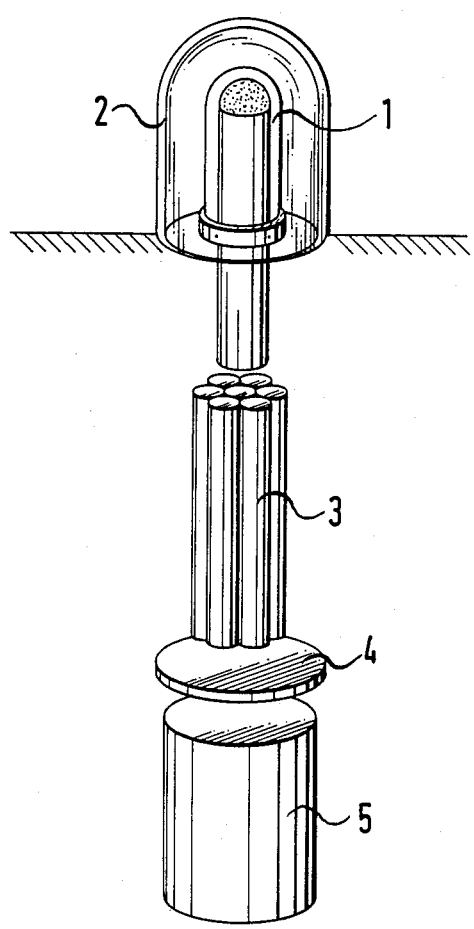
FIG. 1 is an exploded perspective view showing the essential construction of a detector according to the invention in dismantled form.

The entrance system constructed of light-transmitting material according to the invention comprises a hemispherical shell, which is extended by a tube, into which a body is inserted which ends in steps, which seals a granular scattering medium in the spherical shell, and which is fixed, in particular, in a spring-loaded manner. In this arrangement, the stepped body is preferably formed by concentric tubes fitted into one another together with an axial rod, which concentric tubes have been welded to one another after adjustment.

By means of such a system, which is constructed in a relatively simple manner and can, in particular, be adjusted easily, the radiation which is incident from differing directions within an image angle of 180° can be received with uniform sensitivity and passed to a detector (with conversion into a beam emitted substantially parallel to the longitudinal axis of the system). In this arrangement, the angle dependence of downstream optical components such as interference filters and photodetectors (photocathode, semiconductor crystal, etc.) can be compensated by adjustment.

The entrance system can consist of any selectable light-transmitting materials, such as glass or synthetic glass. By means of construction using quartz glass, radiation up to a wavelength of 280 nm (possibly 180 nm) can be received by the detector. In the following text, reference is principally made to this preferred embodiment.

The quartz sand which is employed as scattering medium in this case fills the space between the hemispherical shell and the stepped body, and is retained in this space by the end of the stepped body, which can be formed by a thick quartz rod having an end which is ground in a corresponding stepped shape. However, in a preferred embodiment, the stepped body consists of concentric quartz tubes with a central thin rod. By means of these tubes, the adjustment of the arrangement is designed in a particularly simple manner. Between the rod surface and the hemispherical shell there should be present at least one layer of grains, which layer can be dispensed with if the contact surface of the rod $\leq 1$ mm².

The quartz sand must not be so fine that grains can fall through or into the (albeit small) gap between the tubes pushed into one another. Excessively coarse grains of sand impair the statistics and are therefore also not preferred. Expediently, the grain size is within the range from about 0.2 to 0.5 mm.

The concentric tubes forming "stepped bodies" are, as far as possible, rotationally symmetric and selective, and expediently have wall thicknesses of approximately 1 to 2 mm and form air gaps of a maximum of 0.1 mm. In this way, it is possible to form bodies with approximately 4 to 5 steps of a diameter of approximately 12 mm. The step size is coordinated with the grain size of the scattering medium and is as small as possible, in which connection, however, the breadth should be at least equal to four times the grain diameter.

The steps between the tubes which are concentric but not of equal length are adjusted in the course of assembly, in that the hemispherical shell which reaches over and which is extended by a tube and which is upwardly open is filled with a certain quantity of sand (surrounded by air or a medium having a refractive index different from that of the grain material), whereupon the tubes which are displaceable relative to one another are inserted. This arrangement is adjusted for the adjustment of the step height by means of a lamp which is situated at a distance of approximately 0.5 m and which is movable over a spatial angle of 180°. Once the arrangement has been adjusted, the tubes, which are in the first instance displaceable relative to one another, are then welded to one another, and the end is finely ground for connection to a diaphragm arrangement or a downstream interference filter with detector The hemispherical shell of the above described entrance system is preferably covered by a similarly designed transparent cap, which is included in the adjustment as well and then remains releasably connected to the system. This cap is, in particular, made internally matt, preferably sandblasted; this involves an additional equalization of the spatial light detection. This cap serves, at the same time, as protection. In the event of an external damaging of this cap, the latter can be exchanged in a simple manner. A certain readjustment for the compensation of spatial inhomogeneities of the cap proves to be expedient in the event of exchange.

The exit of the light entrance system can be connected to the entrance surface of the photodetector directly or with the interposition of light guides, diaphragms, filters etc. Particularly expedient is the assembly on a photodetector with interference filter, in which case a bundle of internally blackened tubes is then provided as a diaphragm for matching to the small aperture angle of the filter, if the aim is to provide a handy construction with the lowest possible light loss and a precise mode of operation.

In the following text, the invention is described in greater detail with the aid of an illustrative embodiment, with reference to the accompanying drawings.

The detector shown in FIG. 1 comprises an entrance system 1 with a protecting, internally matted quartz glass cap 2, a diaphragm 3 connected thereto, a downstream interference filter 4 and a photomultiplier 5, the power supply and connections of which are not shown.

Figure 2:
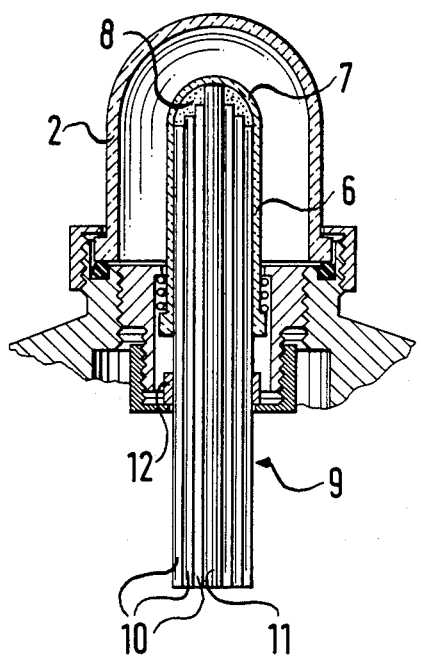
FIG. 2 is a cross-section showing the construction of an entrance system according to the invention

The construction of the entrance system is shown in greater detail in FIG. 2. The hemispherical shell 7 extended by the extension tube 6 accommodates a certain quantity of scattering medium (quartz sand) 8, which is sealed by the stepped body 9. The latter consists of three concentric tubes 10, fitted into the extension tube 6, together with a central rod 11.

For adjustment, the detector is suspended so as to point downwardly, in which connection the tubes 10 then stand together with the glass rod 11 in the quartz sand 8 and do not require any further fixing. The adjustment now takes place by means of a point light source situated at a distance of at least 50 cm, by displacement of the elements of the stepped body relative to one another until such time as the local deviations of light transmitted to the detector from the mean value are less than ±5%.

In this position, the tubes 10 and the rod 1 are melted together at the end, and the ends are ground off. A further glass ring 12 which is fitted on permits the extension tube 6 to be connected to the stepped body 9 in a spring-loaded manner, so that the entrance system can be operated in any selectable direction of incorporation or position in space.

With an outer, internally matted quartz glass cap 2, the sensitivity curve can be adjusted to better than ±5%.

This cap 2, which is sandblasted on the inside in order to improve the scattering properties, also serves for the protection of the internal system. These outer caps 2 can be selected so as to be equally large for differing sizes of entrance systems, and can be produced on a standardized basis, so that the exchange thereof in the event of slight external damage can take place without any problem.

The wavelength dependence of the complete detector is maintained, for example, by the combination of interference filters and matched photocathodes of the light-sensitive unit employed (e.g. consisting of photomultiplier or photodiode). Such an arrangement is shown in FIG. 1.

Such a detector, which can see equally well all light within an image angle of 180°, is adequate for measurements of the chemistry of the air which are carried out on the surface of the earth. For measurements at a greater height above the surface of the earth, it is necessary to use two of these detectors if all light is to be detected. Such an arrangement then has the advantage that direct incident light can be distinguished, so that measurements of the reflectivity of the ground (albedo) are possible.

What is claimed is:

1. An entrance system having an image angle of 180° suitable for a radiation detector for detecting differing wavelengths of sunlight, comprising:
    a hemi-spherical shell of light transmitting material;
    a tube of light transmitting material extending coaxially from said hemi-spherical shell;
    a granulated light scattering medium containing inside said hemi-spherical shell; and
    a stepped body of light transmitting material inserted into said tube, said stepped body having an end which terminates in at least three steps and which abuts against said granulated medium and seals said medium in said hemi-spherical shell.

2. An entrance system as claimed in claim 1, wherein the stepped body sealing the scattering medium is comprised of concentric tubes fitted into one another and an axial rod passing through the innermost concentric tube.

3. An entrance system as claimed in claim 2, wherein said stepped body comprises four to five of said steps.

4. An entrance system as claimed in claim 2, wherein said concentric tubes have a wall thickness of approximately 1 to 2 mm and an air gap between the tubes of at most about 0.1 mm.

5. An entrance system as claimed in claim 1, wherein the scattering medium has a grain size of from about 0.2 to 0.5 mm.

6. An entrance system as claimed in claim 1, wherein the steps have a size which is as small as possible and which is coordinated with the grain size of the scattering medium, the breadth of the steps being at least equal to about four times the grain diameter of the scattering medium.

7. An entrance system as claimed in claim 1, further comprising an exchangeable outer cupola-shaped cap of light-transmitting material surrounding said hemi-spherical shell at a spaced distance.

8. An entrance system as claimed in claim 7, wherein the cap has a matt surface on the inside.

9. An entrance system as claimed in claim 8, wherein said matt surface is sandblasted.

10. An entrance system as claimed in claim 8, wherein the cap comprises a part of an optical calibration system.

11. An entrance system as claimed in claim 7, wherein the cap, hemispherical shell, stepped body and scattering medium are comprised of quartz.

12. An entrance system as claimed in claim 1, further comprising means for securing said stepped body in said tube in a spring-biased manner.

13. An entrance system as claimed in claim 2, wherein said concentric tubes and said rod are welded together after the entrance system is optically calibrated.

14. A radiation detector for sunlight, comprising:
a detector member including a light-sensitive element having an entrance; and
optically connected to said light-sensitive element an entrance system having an entrance and an exit and an image angle of 180° and being suitably for detecting differing wavelengths of sunlight, comprising:
a hemi-spherical shell of light transmitting material;
a tube of light transmitting material extending coaxially from said hemi-spherical shell;
a granulated light scattering medium containing inside said hemi-spherical shell; and
a stepped body of light transmitting material inserted into said tube, said stepped body having an end which terminates in at least three steps and which abuts against said granulated medium and seals said medium in said hemi-spherical shell.

15. A radiation detector as claimed in claim 14, further comprising means, including a diaphragm positioned between the exit of the entrance system and the entrance of the light-sensitive element of the detector, said diaphragm comprising a bundle of internally blackened tubes, for restricting respective aperture angle of the radiation components incident on the entrance of the light-sensitive element.

16. A radiation detector as claimed in claim 15, further comprising a filter interposed between said diaphragm and said light-sensitive element.

* * * * *